United States Patent
Huang

(10) Patent No.: US 10,762,849 B2
(45) Date of Patent: Sep. 1, 2020

(54) PIXEL-RELATED CIRCUIT AND DISPLAY PANEL

(71) Applicant: HKC CORPORATION LIMITED, Shenzhen (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/313,249

(22) PCT Filed: Nov. 13, 2018

(86) PCT No.: PCT/CN2018/115223
§ 371 (c)(1),
(2) Date: Dec. 26, 2018

(87) PCT Pub. No.: WO2020/000866
PCT Pub. Date: Jan. 2, 2020

(65) Prior Publication Data
US 2019/0392761 A1    Dec. 26, 2019

(30) Foreign Application Priority Data

Jun. 22, 2018 (CN) .......................... 2018 1 0669669

(51) Int. Cl.
*G02F 1/1362* (2006.01)
*G09G 3/36* (2006.01)
(Continued)

(52) U.S. Cl.
CPC ......... *G09G 3/3258* (2013.01); *G09G 3/3607* (2013.01); *G09G 3/3677* (2013.01);
(Continued)

(58) Field of Classification Search
CPC ............ G02F 1/1362; G02F 1/136227; G02F 1/13624; G02F 2001/134345; G09G 3/2003; G09G 3/3275; G09G 3/3258; G09G 3/3266; G09G 3/342; G09G 3/36; G09G 3/3607; G09G 3/3677; G09G 2300/0447; G09G 2300/0452; G09G 2320/0242; G09G 2320/024; H01L 27/3213
See application file for complete search history.

(56) References Cited

U.S. PATENT DOCUMENTS 6,611,261 B1 * 8/2003 Zhang .................. G09G 3/3688
345/1.1
9,036,013 B2    5/2015 Lee et al.
(Continued)

FOREIGN PATENT DOCUMENTS

CN        101667742 A      3/2010
CN        102750921 A      10/2012
(Continued)

OTHER PUBLICATIONS

Yuan Li, the ISA written comments, Mar. 2019, CN.

*Primary Examiner* — Michael J Eurice

(57) ABSTRACT

A pixel-related circuit and a display panel are provided. The pixel-related circuit includes a plurality of pixel groups arranged in an array. The pixel group includes several pixel cells. Each pixel cell includes a first switch, a second switch, a voltage-dividing switch, and a common electrode line.

20 Claims, 3 Drawing Sheets

(51) Int. Cl.
*G09G 3/3258* (2016.01)
*G09G 3/3275* (2016.01)
*G09G 3/3266* (2016.01)

(52) U.S. Cl.
CPC ......... *G02F 1/1362* (2013.01); *G09G 3/3266* (2013.01); *G09G 3/3275* (2013.01); *G09G 3/36* (2013.01)

(56) References Cited

U.S. PATENT DOCUMENTS

| | | | | |
|---|---|---|---|---|
| 2005/0275610 | A1* | 12/2005 | Roh | G09G 3/3614 345/88 |
| 2008/0062341 | A1* | 3/2008 | Tanaka | G02F 1/136213 349/38 |
| 2008/0198285 | A1* | 8/2008 | Hsieh | G09G 3/3659 349/39 |
| 2009/0051638 | A1* | 2/2009 | Horiuchi | G09G 3/2003 345/88 |
| 2009/0102997 | A1 | 4/2009 | Wen et al. | |
| 2012/0147065 | A1* | 6/2012 | Byun | G09G 3/3208 345/690 |
| 2012/0268357 | A1* | 10/2012 | Shih | G09G 3/3607 345/88 |
| 2014/0313445 | A1* | 10/2014 | Kimura | H01L 27/1218 349/42 |
| 2015/0002775 | A1* | 1/2015 | Chang | G02F 1/133512 349/43 |
| 2015/0036069 | A1* | 2/2015 | Xue | H04N 13/356 349/39 |
| 2016/0041664 | A1* | 2/2016 | Qin | G06F 3/044 345/173 |
| 2016/0246089 | A1* | 8/2016 | Jeong | H01L 29/42384 |
| 2018/0247957 | A1* | 8/2018 | Jeong | H01L 29/42384 |

FOREIGN PATENT DOCUMENTS

| | | |
|---|---|---|
| CN | 103278981 A | 9/2013 |
| CN | 103323990 A | 9/2013 |
| CN | 103490748 A | 1/2014 |
| CN | 104777635 A | 7/2015 |
| JP | 2008065058 A | 3/2008 |

\* cited by examiner

PIXEL-RELATED CIRCUIT AND DISPLAY PANEL

CROSS-REFERENCE TO RELATED APPLICATIONS

This application is the International Application No. PCT/CN2018/115223 for entry into US national phase with an international filing date of Nov. 13, 2018, designating US, now pending, and claims priority to Chinese Patent Application No. 201810669669.8, filed on Jun. 22, 2018, the content of which is incorporated herein by reference in its entirety.

FIELD

This application relates to the field of display technologies, and in particular, to a pixel-related circuit and a display panel.

BACKGROUND

In a conventional display panel, when pixels are poorly designed or a manufacturing process is mutated, the problem of a color shift at a large viewing angle occurs. The reason is that during viewing from a side at a large viewing angle, a color is displayed slightly dark. For a blue pixel, at an intermediate gray level or a low gray level, the blue pixel has a relatively low bias voltage, and as a result, the brightness of a blue sub pixel region is turned on relatively late. In a design of R, G, and B pixels, voltage-dividing switches of the pixels are all connected to a same common electrode line. In this design, a color cannot be regulated to mitigate the phenomenon of an offset at a large viewing angle. Therefore, it is necessary to provide a new pixel-related circuit design to resolve such a problem.

SUMMARY

An object of this application is to provide a pixel-related circuit and a display panel, including, but not limited to be solving the technical problems that a relatively large color shift exists among pixel cells having different colors in a display panel, the brightness of each pixel cannot be adjusted independently, and the display panel has slightly yellow display at a large viewing angle.

To resolve the foregoing technical problems, a technical solution used in an embodiment of this application is as follows: A pixel-related circuit includes:

a plurality of pixel groups arranged in an array, where each pixel group has several pixel cells, each pixel cell is coupled to a corresponding data line and a corresponding scan line, and each pixel cell includes:

a first switch, disposed in a main pixel region of the pixel cell;

a second switch, disposed in a sub pixel region of the pixel cell;

a voltage-dividing switch, disposed in the sub pixel region of the pixel cell, and coupled to the second switch; and a common electrode line, connected to the voltage-dividing switch, where the common electrode line includes a first common electrode line and a second common electrode line, where control ends of the first switch, the second switch, and the voltage-dividing switch are connected to a same scan line, the voltage-dividing switches of some pixel cells are connected to the first common electrode line through connecting holes, and the voltage-dividing switches of some other pixel cells are connected to the second common electrode line; and one or more pixel cells are connected to the second common electrode line, and the pixel cell connected to the second common electrode line includes any one of a blue pixel cell, a red pixel cell, and a green pixel cell.

Another object of this application is to provide a pixel-related circuit, including:

a plurality of pixel groups arranged in an array, where each pixel group has several pixel cells, each pixel cell is coupled to a corresponding data line and a corresponding scan line, and each pixel cell includes:

a first switch, disposed in a main pixel region of the pixel cell;

a second switch, disposed in a sub pixel region of the pixel cell;

a voltage-dividing switch, disposed in the sub pixel region of the pixel cell, and coupled to the second switch; and a common electrode line, connected to the voltage-dividing switch, where the common electrode line includes a first common electrode line and a second common electrode line, where control ends of the first switch, the second switch, and the voltage-dividing switch are connected to a same scan line, the voltage-dividing switches of some pixel cells are connected to the first common electrode line through connecting holes, the voltage-dividing switches of some other pixel cells are connected to the second common electrode line, and one or more pixel cells are connected to the second common electrode line;

the pixel cell connected to the second common electrode line is any one of a blue pixel cell, a red pixel cell, and a green pixel cell, and in different pixel groups, pixel cells that have different colors or the same color are connected to the second common electrode line;

each pixel group includes three pixel cells having colors different from each other, the voltage-dividing switch of a first pixel cell and the voltage-dividing switch of a second pixel cell are connected to the first common electrode line, and the voltage-dividing switch of a third pixel cell is connected to the second common electrode line;

the third pixel cell is a blue pixel cell, a red pixel cell or a green pixel cell; and the first common electrode line and the second common electrode line are driven independently or simultaneously.

Still another object of this application is to provide a display panel, including:

a substrate, where an active switch is formed on the substrate; and a pixel-related circuit, disposed on the substrate, and coupled to the active switch, where the pixel-related circuit includes:

a plurality of pixel groups arranged in an array, where each pixel group has several pixel cells, each pixel cell is coupled to a corresponding data line and a corresponding scan line, and each pixel cell includes:

a first switch, disposed in a main pixel region of the pixel cell;

a second switch, disposed in a sub pixel region of the pixel cell;

a voltage-dividing switch, disposed in the sub pixel region of the pixel cell, and coupled to the second switch; and a common electrode line, connected to the voltage-dividing switch, where the common electrode line includes a first common electrode line and a second common electrode line, where control ends of the first switch, the second switch, and the voltage-dividing switch are connected to a same scan line, the voltage-dividing switches of some pixel cells are connected to the first common electrode line through connecting holes, and the voltage-dividing switches of some other pixel cells are connected to the second common electrode line; and one or more pixel cells are connected to the second common electrode line, and the pixel cell connected to the second common electrode line includes any one of a blue pixel cell, a red pixel cell, and a green pixel cell.

For the pixel-related circuit provided in the embodiments of this application, a structural design of a common electrode line is used. Each pixel group is driven by using two common electrode lines. Pixel cells may be driven independently or simultaneously to emit corresponding light, and light-emitting degrees of the pixel cells are properly adjusted. A display panel can combine a plurality of pixel cells to present a complete and distinct picture, so that the display panel has a better display effect at a large viewing angle. The problem of a color shift between pixel cells having different colors in a display panel and the problem of slightly yellow display at a large viewing angle in the exemplary technology are resolved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF THE DRAWINGS

To make the objects, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

It should be noted that when an element is referred to as being "fixed" to or "disposed" on another element, it can be directly on another element or indirectly on the another element. When an element is referred to as being "connected" to another element, it can be directly or indirectly connected to another element. Orientation or position relationships indicated by the terms such as "on", "below", "left", and "right" are based on orientation or position relationships shown in the accompanying drawings, and are used only for ease of illustration description, rather than indicating or implying that the mentioned apparatus or component must have a particular orientation or must be constructed and operated in a particular orientation. Therefore, such terms should not be construed as limiting of the patent. A person of ordinary skill in the art can understand the specific meaning of these terms according to specific situations. The terms such as "first" and "second" are used only for the purpose of description, and should not be understood as indicating or implying the relative importance or implicitly specifying the number of the indicated technical features. Unless otherwise particularly defined, "a plurality of" means two or more than two.

The technical solutions of this application are described in detail below with reference to the specific accompanying drawings and embodiments.

Figure 1:
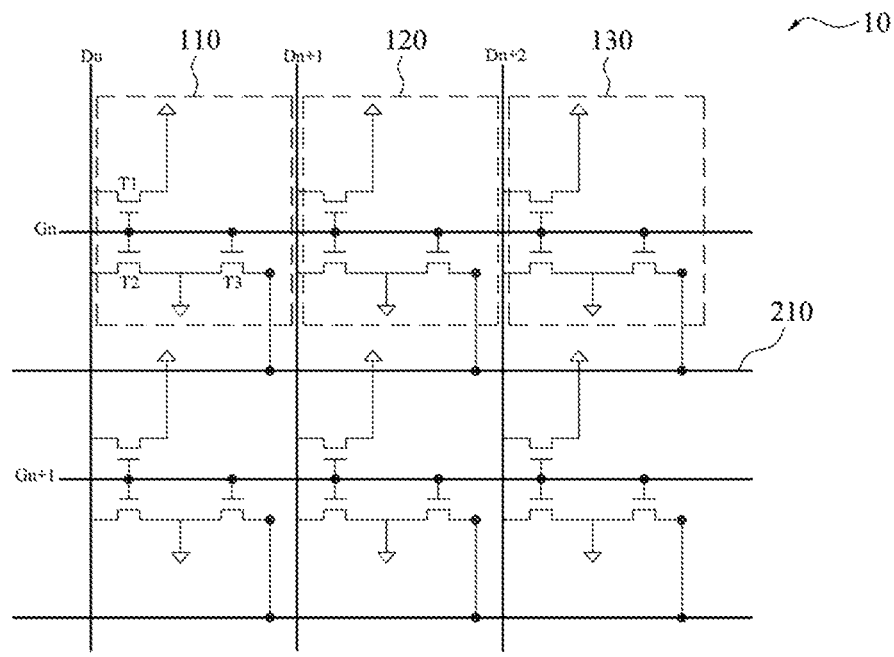
FIG. 1 is a schematic structural diagram of an exemplary pixel-related circuit according to an embodiment of this application.

FIG. 1 is a schematic diagram of an exemplary pixel-related circuit according to an embodiment of this application. Referring to FIG. 1, an exemplary pixel-related circuit 10 includes a plurality of pixel groups arranged in an array. Each pixel group includes several pixel cells. The pixel group may include, for example, three pixel cells (red, green, and blue, RGB), or four pixel cells (red, green, blue, and white, RGBW). Three pixel cells are used as an example in FIG. 1. Each pixel cell is coupled to a corresponding data line and a corresponding scan line, where n is a positive integer. For example, a pixel cell 110 is coupled to a data line Dn and a scan line Gn, a pixel cell 120 is coupled to a data line Dn+1 and the scan line Gn, and a pixel cell 130 is coupled to a data line Dn+2 and the scan line Gn. Each pixel cell includes: a first switch T1; a second switch T2; and a voltage-dividing switch T3, where the third switch T3 is connected to a common electrode line 210. The first switch T1 is connected to a main pixel region. The second switch T2 and the voltage-dividing switch T3 are connected to a sub pixel region. By using a voltage-dividing effect of the voltage-dividing switch T3, the main pixel region and the sub pixel region may have different electrical potentials, so that display effects of the main pixel region and the sub pixel region are differentiated, thereby achieving the effects of a low color shift and improved display quality. However, because the pixel-related circuit is precise and sensitive, any slight negligence in a manufacturing process may substantially affect a display effect. In addition, during viewing from a side at a large viewing angle, a pixel cell of a color (for example, blue) may be displayed slightly dark due to a circuit problem. Furthermore, because the pixel cell 110, the pixel cell 120, and the pixel cell 130 are connected to a same common electrode line 210, a pixel cell that has a color or is in a region cannot be independently adjusted, resulting in reduced quality of an overall picture on an a display panel.

Figure 2:
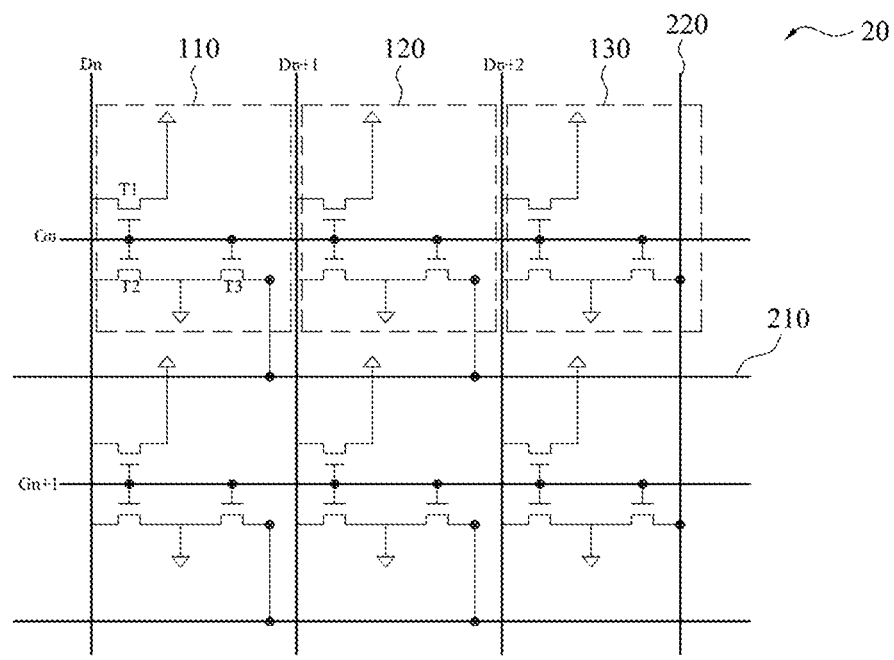
FIG. 2 is another schematic structural diagram of a pixel-related circuit according to an embodiment of this application.

FIG. 2 is a schematic diagram of a pixel-related circuit according to an embodiment of this application. Referring to FIG. 2, in this embodiment of this application, a pixel-related circuit 20 includes a plurality of pixel groups arranged in an array. Each pixel group includes three pixel cells, namely, a first pixel cell 110, a second pixel cell 120, and a third pixel cell 130. Each pixel cell is coupled to a corresponding data line and a corresponding scan line. Each pixel cell includes: a first switch T1, disposed in a main pixel region of the pixel cell; a second switch T2, disposed in a sub pixel region of the pixel cell; a voltage-dividing switch T3, disposed in the sub pixel region of the pixel cell, and coupled to the second switch; and a common electrode line, connected to the voltage-dividing switch T3, where the common electrode line includes a first common electrode line 210 and a second common electrode line 220. In each pixel group, control ends of the first switch T1, the second switch T2, and the voltage-dividing switch T3 of a same pixel cell are connected to a same scan line, the voltage-dividing switches of some pixel cells are connected to the first common electrode line 210 through connecting holes, the voltage-dividing switches of some other pixel cells are connected to the second common electrode line 220, and one pixel cell is connected to the second common electrode line 220.

In this embodiment of this application, a common voltage exists respectively on the first common electrode line 210 and the second common electrode line 220. By adjusting a voltage difference between a voltage on each pixel region in a pixel cell and the common voltage, a picture display effect of a display panel can be adjusted correspondingly to provide a user with desirable visual experience. As shown in FIG. 2, the pixel-related circuit 20 includes two common electrode lines (the first common electrode line 210 and the second common electrode line 220), and a voltage state of the sub pixel region can be controlled by using the voltage-dividing switch, so that the main pixel region and the sub pixel region have different voltage differences. Therefore, a light-emitting condition of each pixel cell is changed, and color scales of light sources in the pixel cell have higher adjustability. For a picture on the display panel, pixel cells having three basic colors can be combined to achieve the effect of a low color shift, so that the display panel has improved picture display quality at a large viewing angle, and a circuit structure of the pixel-related circuit 20 is further simplified, thereby resolving the problems in the conventional technology that each pixel in a display panel has low adjustability, the display panel has a relatively severe color shift phenomenon at a large viewing angle, and visual experience is not desirable for a user.

In alternative implementations, the pixel cell connected to the second common electrode line 220 may be, for example, at least any one of a blue pixel cell, a red pixel cell, a green pixel cell, and a white pixel cell. However, it is not limited that one pixel cell or a plurality of pixel cells having the same color and the same configuration is connected to the second common electrode line 220.

In alternative implementations, in different pixel groups, pixel cells that have different colors or the same color are connected to the second common electrode line 220.

In this embodiment of this application, the second common electrode line 220 can change power supply states of sub pixel regions in a plurality of pixel cells. The pixel cells can display light having different colors and different brightness, thereby improving display effects of different single colors of the pixel cells. The pixel groups can combine the plurality of pixel cells to present a complete picture, so that a display effect at a large viewing angle of the display panel is improved, and a picture on the display panel can present different gray levels.

In alternative implementations, in different pixel groups, pixel cells that have different colors or the same color are connected to the first common electrode line 210.

In this embodiment of this application, overall picture scales on the display panel can be adjusted by using differences between the common voltage on the first common electrode line 210 and pixel voltages on pixel cells. In this way, when the common voltage on the first common electrode line 210 changes, colors of a plurality of pixel cells also present different light-emitting states. Therefore, the pixel-related circuit 20 combines light colors of different pixel cells, to improve picture quality of the display panel and mitigate the problem of slightly yellow display at a large viewing angle.

In alternative implementations, as shown in FIG. 2, in each pixel cell, a first conduction terminal of the first switch T1 is connected to the data line, a second conduction terminal of the first switch T1 is connected to a pixel electrode of the main pixel region, a first conduction terminal of the second switch T2 is connected to the data line, a second conduction terminal of the second switch T2 and a first conduction terminal of the third switch T3 are jointly connected to a pixel electrode of the sub pixel region, and a second conduction terminal of the third switch T3 is connected to the common electrode line.

Optionally, in the pixel cell in this embodiment, the second conduction terminal of the third switch T3 is connected to the first common electrode line 210 or the second common electrode line 220. The third switch T3 is switched on or off to change a voltage on a pixel electrode of a sub-pixel in the pixel cell, so as to adjust a light-emitting state of each pixel cell. When the third switch T3 is switched on, the pixel electrode of the sub-pixel, the first conduction terminal of the third switch T3, the second conduction terminal of the third switch T3, and the common electrode line form a current branch, so as to change the voltage on the pixel electrode of the sub-pixel. An electrical potential in the main pixel region and an electrical potential in the sub pixel region are not the same, and each pixel cell can display light having a corresponding color.

In alternative implementations, the first switch T1 is a MOS transistor or a bipolar transistor, the second switch T2 is a MOS transistor or a bipolar transistor, and the third switch T3 is a MOS transistor or a bipolar transistor. When a scan signal on a scan line is transmitted to the control ends of the switches, the scan signal can be used to control the switches to be switched on or off, to adjust a light-emitting state of the pixel cell, thereby implementing a low color shift design for a picture on the display panel and simplifying the circuit structure of the pixel-related circuit 20. Therefore, the adjustment of the light-emitting state of the pixel cell has higher flexibility, and the pixels in the display panel have lower scan driving costs.

In alternative implementations, in each pixel cell, the first conduction terminal of the first switch T1 and the first conduction terminal of the second switch T2 are connected to a same data line.

In this embodiment of this application, the first switch T1 can control a light-emitting state of the main pixel region in the pixel cell, and the second switch T2 can control a light-emitting state of the sub pixel region in the pixel cell. In this embodiment of this application, working states of the main pixel region and the sub pixel region can be driven by using one data signal, so that an image display effect of each pixel cell is improved and the display panel has a better overall picture display effect. A quantity of data signals in the pixel-related circuit 20 is reduced, and scan driving costs of the pixel cell are reduced. The overall coordinated control performance of the main pixel region and the sub pixel region in the pixel cell is improved. The display panel has a better display effect at a large viewing angle. The circuit structure of the pixel-related circuit 20 is further simplified.

In alternative implementations, in each pixel group, the common voltage on the first common electrode line 210 and the common voltage on the second common electrode line 220 are different from each other.

The common voltage on the first common electrode line 210 and the common voltage on the second common electrode line 220 can be used to change a picture display state in the display panel. Therefore, when the pixel cell connected to the first common electrode line 210 and the pixel cell connected to the second common electrode line 220 have different common voltages, a pixel voltage on each pixel cell has a different voltage difference from a corresponding common voltage, so that a light-emitting state of each pixel cell can be adjusted independently, so that the adjustability of a picture on the display panel is improved, a display effect at a large viewing angle of the display panel is improved, and the picture on the display panel can present different gray levels by combining different pixel cells.

In alternative implementations, in a same pixel group, any two pixel cells are connected to different data lines.

In this embodiment of this application, as shown in FIG. 2, because a corresponding data signal exists on a data line, different pixel cells in a same pixel group are respectively connected to different data signals. A data signal can control a working state of each pixel cell, so that each pixel cell can implement a different light-emitting effect. A light-emitting state of each pixel cell in the pixel-related circuit 20 has higher adjustability. The display panel can combine different pixel cells to present pictures having different color scales, visual experience is better for a user, and the phenomenon of an offset at a large viewing angle of the display panel is mitigated.

In alternative implementations, in a same pixel group, all the pixel cells are connected to a same scan line.

In this embodiment of this application, one pixel group includes a plurality of pixel cells, and each pixel cell can implement a different light-emitting effect. A scan signal exists on the scan line. The scan signal controls a switch in the pixel cell to be switched on or off, to drive the pixel cell to implement the corresponding light-emitting effect. The pixel-related circuit 20 can control light-emitting states of the plurality of pixel cells by using one scan signal, so that the overall coordination performance of different pixel cells is improved, scan driving costs for the plurality of pixel cells in the display panel are reduced, and the circuit structure of the pixel-related circuit 20 is simplified. Therefore, the display panel can combine the plurality of pixel cells to present a better picture effect at a large viewing angle.

In alternative implementations, in any two adjacent pixel groups, pixel cells located in different pixel groups are respectively connected to different scan lines.

In this embodiment of this application, each pixel group is connected to each scan line in a one-to-one correspondence. The scan lines can be used to drive corresponding pixel groups to emit light having different colors and brightness. The plurality of pixel groups can combine light having different colors to emit light having various color scales and brightness. A picture on the display panel is driven by a scan signal to display a corresponding image/video. A light-emitting state of each pixel group in the display panel can implement independent adjustment. The picture on the display panel can present a better display effect at a large viewing angle, the image/video is more distinct, and the problem of a color shift at a large viewing angle of the display panel is mitigated.

In alternative implementations, in the pixel group, each pixel cell uses an N-domain design, where N is a positive integer greater than or equal to 1.

In alternative implementations, in the pixel-related circuit 20, all the pixel cells have the same quantity of domains.

In this embodiment of this application, each pixel cell has a plurality of domains. For example, each pixel cell uses a design of two domains or four domains. Each domain is driven by a scan signal and a drive signal to emit light having a corresponding color or brightness. When each pixel cell uses a multi-domain design, each domain in the pixel cell can implement an independent light-emitting effect, so that the pixel cell combines a plurality of domains to emit light having a plurality of color scales. The overall brightness and colors of a picture on the display panel have better adaptation performance and coordination performance, thereby improving an overall picture display effect of the display panel.

In an implementation, as shown in FIG. 2, each pixel group includes three pixel cells having colors different from each other, the voltage-dividing switch of the first pixel cell 110 and the voltage-dividing switch of the second pixel cell 120 are connected to the first common electrode line 210, and the voltage-dividing switch of the third pixel cell 130 is connected to the second common electrode line 220.

In this embodiment of this application, the first common electrode line 210 and the second common electrode line 220 can drive the three pixel cells having colors different from each other to work simultaneously, and the common electrode line (including the first common electrode line 210 and the second common electrode line 220) can control a voltage on each pixel cell, to enable each pixel cell to present a different light-emitting state. The second common electrode line 220 can independently control a pixel voltage on the third pixel cell 130, thereby improving the adjustability of a light-emitting state of the display panel. The display panel can combine different pixel cells to display a more coordinated picture.

In this embodiment of this application, three pixel cells in each pixel group have colors different from each other. The colors of the three pixel cells may include, for example, three primary colors, red, green, and blue. For example, in one pixel group, the first pixel cell 110 is red, the second pixel cell 120 is green, and the third pixel cell 130 is blue, so that each pixel group can combine three basic colors to present pictures having different color scales, and picture colors on the display panel have higher adjustability.

In alternative implementations, the third pixel cell 130 is a blue pixel cell, a red pixel cell or a green pixel cell.

For example, a blue pixel cell is connected to the second common electrode line 220. However, this application is not limited to a blue pixel cell. Another single-color pixel cell such as a red pixel cell and a green pixel cell may be connected to the second common electrode line 220. That is, the second common electrode line 220 controls an electrical potential state of a blue pixel cell 130 independently by using the voltage-dividing switch T3, so that a light-emitting state and a light-emitting degree of the blue pixel cell 130 can be flexibly controlled. The first common electrode line 210 controls light-emitting states and light-emitting degrees of the red pixel cell and the green pixel cell. The second common electrode line 220 controls the blue pixel cell 130 independently, so that the phenomenon that light emitted by the blue pixel cell 130 is slightly dark can be resolved. Specifically, the phenomenon of slightly yellow display at a large viewing angle and the problem of a color shift at a large viewing angle caused by the phenomenon are mitigated, thereby improving a picture display effect.

Figure 3:
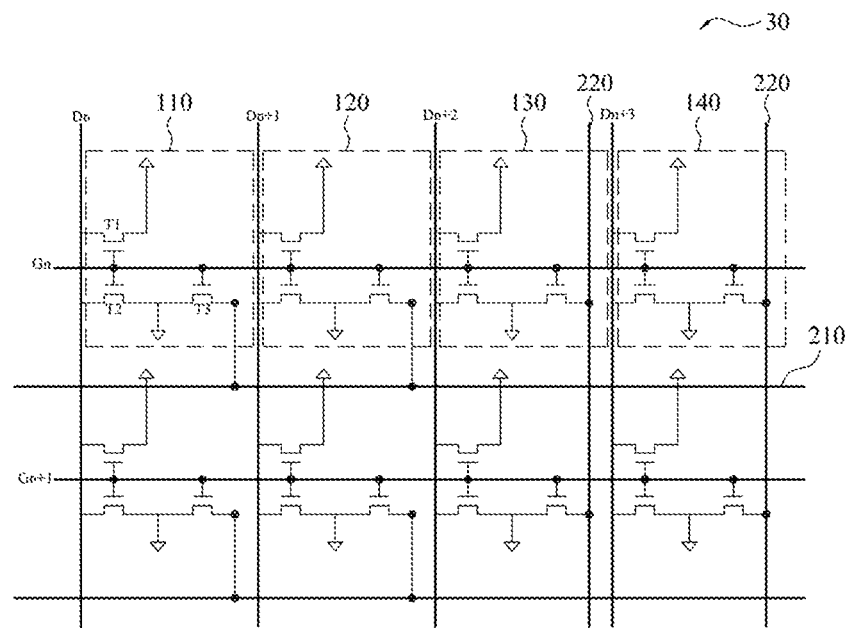
FIG. 3 is another schematic structural diagram of a pixel-related circuit according to an embodiment of this application.

In alternative implementations, FIG. 3 is a circuit schematic of a pixel-related circuit 30 according to an embodiment of this application. As shown in FIG. 3, the pixel-related circuit 30 includes a plurality of pixel groups arranged in an array. Each pixel group includes four pixel cells, namely, a first pixel cell 110, a second pixel cell 120, a third pixel cell 130, and a fourth pixel cell 140. Each pixel cell is coupled to a corresponding data line and a corresponding scan line, and can control a corresponding pixel cell by using a data signal and a scan signal to emit corresponding light. Each pixel cell includes: a first switch T1; a second switch T2; a voltage-dividing switch T3; and a common electrode line, connected to the voltage-dividing switch T3. The common electrode line includes a first common electrode line 210 and a second common electrode line 220. In each pixel group, the voltage-dividing switches of some pixel cells T3 are connected to the first common electrode line through connecting holes 210, the voltage-dividing switches of some other pixel cells T3 are connected to the second common electrode line 220, and two pixel cells are connected to the second common electrode line 220.

In alternative implementations, as shown in FIG. 3, the voltage-dividing switches of the first pixel cell 110 and the second pixel cell 120 are connected to the first common electrode line 210, and the voltage-dividing switches of the third pixel cell 130 and the fourth pixel cell 140 are connected to the second common electrode line 220.

In alternative implementations, the third pixel cell 130 may be, for example, a blue pixel cell, a red pixel cell or a green pixel cell, and the fourth pixel cell 140 may be, for example, a white pixel cell. That is, a white pixel cell 140 and a single-color pixel cell are connected to the second common electrode line 220.

In this embodiment of this application, the white pixel cell 140 is combined with a corresponding single-color pixel cell, so that an aperture ratio of a single-color pixel cell can be improved. Light-emitting states of the third pixel cell 130 and the fourth pixel cell 140 can be controlled by using the second common electrode line 220. In the pixel-related circuit 30, a signal driving manner of the first pixel cell 110 and the second pixel cell 120 is different from a signal driving manner of the third pixel cell 130 and the fourth pixel cell 140 to implement different light-emitting effects. In addition, compared with the foregoing pixel-related circuit 20, in the pixel-related circuit 30, a light-emitting state of each pixel cell in the pixel group has higher operability, and problems such as a dark corner and a color shift at a large viewing angle of the single-color pixel cell can further be mitigated, so that picture display is more uniform.

Figure 4:
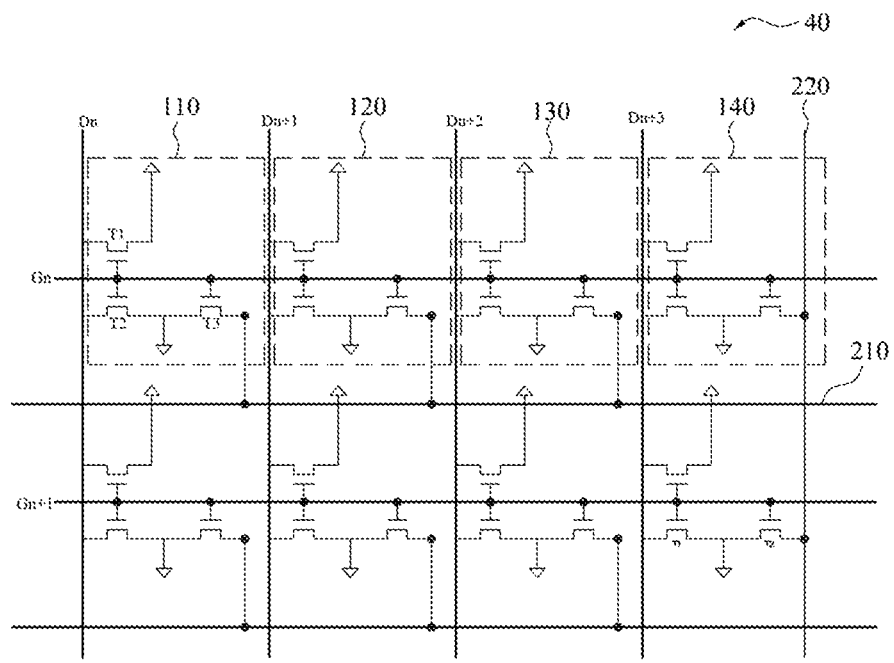
FIG. 4 is another schematic structural diagram of a pixel-related circuit according to an embodiment of this application.

In alternative implementations, FIG. 4 is a circuit schematic of a pixel-related circuit 40 according to an embodiment of this application. As shown in FIG. 4, the pixel-related circuit 40 includes a plurality of pixel groups arranged in an array. Each pixel group includes a first pixel cell 110, a second pixel cell 120, a third pixel cell 130, and a fourth pixel cell 140. Each pixel cell is coupled to a corresponding data line and a corresponding scan line. In each pixel group, four pixel cells have colors different from each other. The first pixel cell 110, the second pixel cell 120, and the third pixel cell 130 are connected to a first common electrode line 210, and the fourth pixel cell 140 is connected to the second common electrode line 220.

In alternative implementations, the fourth pixel cell 140 may be, for example, a blue pixel cell, a red pixel cell or a green pixel cell. However, this application is not limited thereto. The fourth pixel cell 140 may alternatively be, for example, a yellow pixel cell or a cyan pixel cell.

In this embodiment of this application, the second common electrode line 220 can independently adjust a light-emitting state of the fourth pixel cell 140, to enable the fourth pixel cell 140 to present different light-emitting effects, thereby enhancing the coordination among different pixel cells in a same pixel group. Each pixel cell in a display panel can be in a better working state. The display panel has a better display effect at a large viewing angle. The problem of slightly yellow display at a large viewing angle in the display panel can be mitigated.

Figure 5:
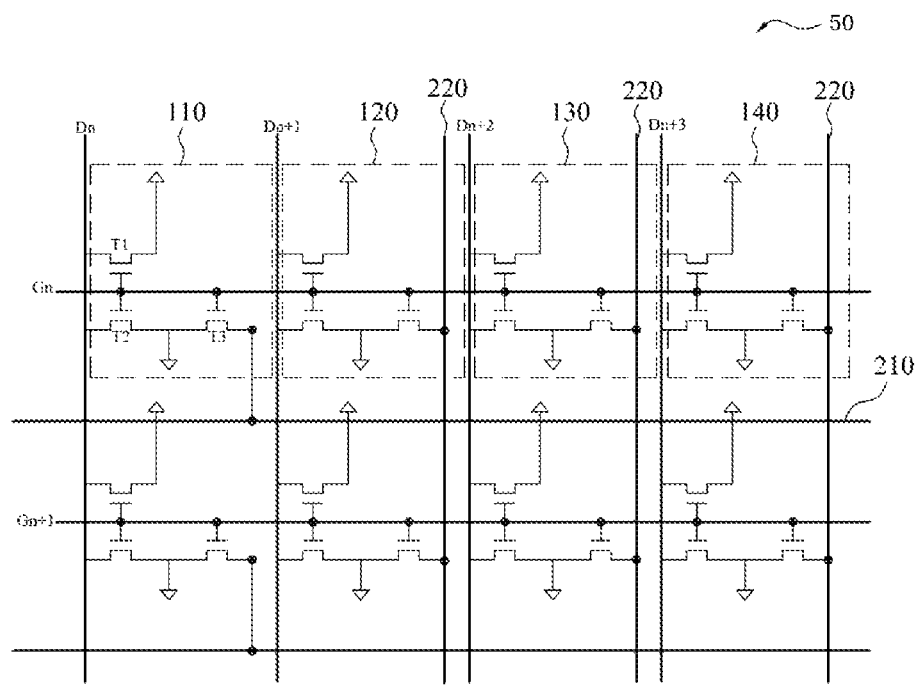
FIG. 5 is another schematic structural diagram of a pixel-related circuit according to an embodiment of this application.

In alternative implementations, FIG. 5 is a circuit schematic of a pixel-related circuit 50 according to an embodiment of this application. As shown in FIG. 5, the pixel-related circuit 50 includes a plurality of pixel groups arranged in an array. Each pixel group includes a first pixel cell 110, a second pixel cell 120, a third pixel cell 130, and a fourth pixel cell 140. Each pixel cell is coupled to a corresponding data line and a corresponding scan line. In each pixel group, four pixel cells have colors different from each other. The first pixel cell 110 is connected to a first common electrode line 210. The second pixel cell 120, the third pixel cell 130, and the fourth pixel cell 140 are connected to the second common electrode line 220.

In alternative implementations, the fourth pixel cell 140 is a white pixel cell, the second pixel cell 120 is a blue pixel cell, a red pixel cell or a green pixel cell, and the third pixel cell 130 is a blue pixel cell, a red pixel cell or a green pixel cell.

In this embodiment of this application, for example, the first pixel cell 110 is a red pixel cell, the second pixel cell 120 is a blue pixel cell, the third pixel cell 130 is a green pixel cell, and the fourth pixel cell 140 is a white pixel cell. The first common electrode line 210 can control a light-emitting state of the first pixel cell 110, and the second common electrode line 220 can control light-emitting states of the second pixel cell 120, the third pixel cell 130, and the fourth pixel cell 140, so that working states of different pixel cells can be adjusted respectively, the picture brightness on the display panel can be adjusted in real time, and the display panel has a better picture display effect at a large viewing angle, so as to provide a user with desirable visual experience.

In some embodiments, the first common electrode line 210 and the second common electrode line 220 are connected to some pixel cells respectively. However, in essence, the first common electrode line 210 and the second common electrode line 220 are both electrode layers. That is, the first common electrode line 210 and the second common electrode line 220 may be used interchangeably. That is, instead of the second common electrode line 220 that controls a single-color pixel cell in the foregoing embodiments, the first common electrode line 210 performs control. This application is not limited to the circuit configuration of the first common electrode line 210 and the second common electrode line 220 in the figure.

In the foregoing embodiments, the first common electrode line 210 and the second common electrode line 220 are driven independently but may alternatively be driven simultaneously. When the pixel-related circuit has problems that cause phenomena of a color shift and slightly yellow display at a large viewing angle, such problems can be effectively resolved.

In some embodiments, the some pixel cells and the some other pixel cells constitute all the pixel cells on the panel.

In some embodiments, pixel cells located in a same row are correspondingly connected to the same first common electrode line 210 or correspondingly connected to different second common electrode lines 220. Pixel cells located in a same column are correspondingly connected to different first common electrode lines 210 or correspondingly connected to the same second common electrode line 220.

In some embodiments, some of the voltage-dividing switches and the first common electrode line are directly connected through connecting holes. However, this application is not limited thereto. An electrically conductive substance may alternatively be used as an intermediate substance to connect some of the voltage-dividing switches and the first common electrode line. The electrically conductive substance may be, for example, an electrically conductive metal or a compound thereof.

Referring to FIG. 2 to FIG. 5 together, an embodiment of this application provides a display panel, where the display panel includes:

a substrate, where an active switch is formed on the substrate; and a pixel-related circuit, disposed on the substrate, and coupled to the active switch.

The pixel-related circuit includes:

a plurality of pixel groups arranged in an array, where each pixel group has several pixel cells, each pixel cell is coupled to a corresponding data line and a corresponding scan line, and each pixel cell includes:

a first switch, disposed in a main pixel region of the pixel cell;

a second switch, disposed in a sub pixel region of the pixel cell;

a voltage-dividing switch, disposed in the sub pixel region of the pixel cell, and coupled to the second switch; and a common electrode line, connected to the voltage-dividing switch, where the common electrode line includes a first common electrode line and a second common electrode line.

Control ends of the first switch, the second switch, and the voltage-dividing switch are connected to a same scan line, the voltage-dividing switches of some pixel cells are connected to the first common electrode line through connecting holes, and the voltage-dividing switches of some other pixel cells are connected to the second common electrode line.

One or more pixel cells are connected to the second common electrode line, and the pixel cell connected to the second common electrode line includes any one of a blue pixel cell, a red pixel cell, and a green pixel cell.

In this embodiment of this application, the display panel may be, for example, a liquid crystal display panel, and has a color film substrate and an active switch substrate. However, this application is not limited thereto. The display panel may alternatively be an organic electroluminescence display (OLED) display panel, a quantum-dot light-emitting diode (QLED) display panel, a plasma display panel, a curved display panel or another type of display panel.

Figure 6:
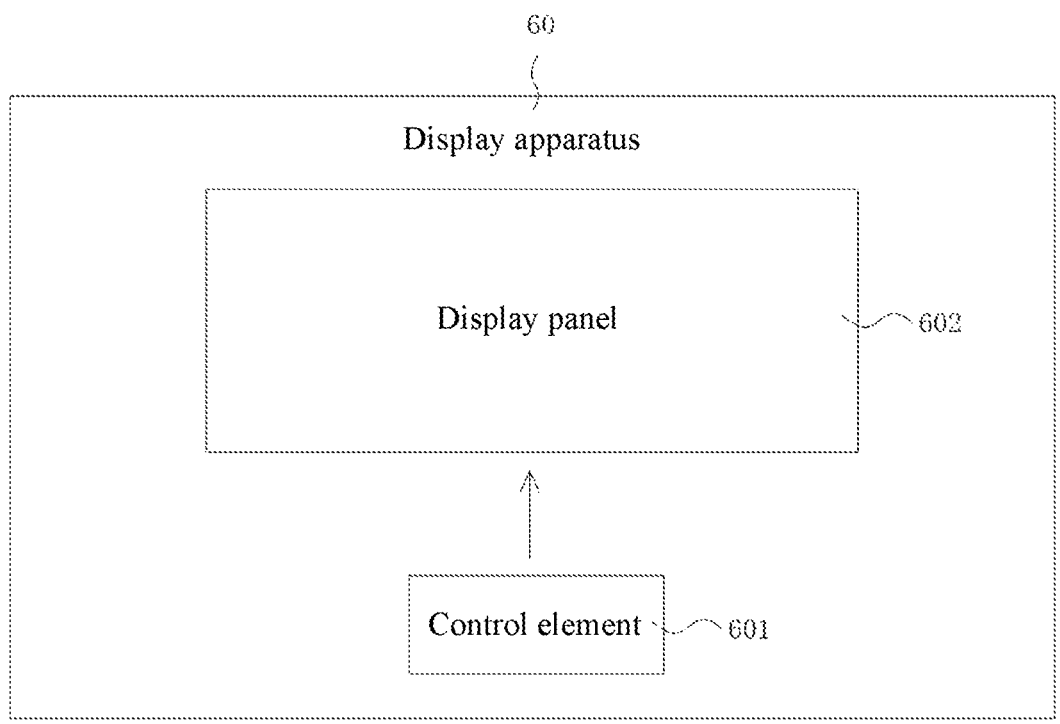
FIG. 6 is a schematic structural diagram of a display apparatus according to an embodiment of this application.

FIG. 6 shows a modular structure of a display apparatus according to an embodiment of this application. Referring to both FIG. 2 and FIG. 6, in this embodiment of this application, a display apparatus 60 includes a control element 601 and a display panel 602. For a specific implementation of the display panel 602, refer to the embodiments in FIG. 2 to FIG. 5. Details are not described herein again.

In this application, a structural design of a pixel-related circuit and a common electrode line is used, so that the common electrode line may drive pixel cells independently or simultaneously, and may properly adjust a light-emitting state and a light-emitting degree of the pixel cells. In this way, the problems such as a color shift and a dark fringe between pixel cells having different colors caused by circuit defects or poor manufacturing processes can be resolved, so that the phenomenon of poor visual effects at a large viewing angle can be improved, thereby improving product quality and competitiveness.

The above descriptions are merely optional embodiments of this application, and are not intended to limit this application. A person skilled in the art may make various variations and changes to this application. Any modification, equivalent replacement, or improvement made without departing from the spirit and principle of this application shall fall within the scope as defined by the appended claims of this application.

What is claimed is:

1. A pixel-related circuit, comprising:
a plurality of pixel groups arranged in an array, wherein each pixel group has several pixel cells, each pixel cell is coupled to a corresponding data line and a corresponding scan line, and each pixel cell comprises:
a first switch, disposed in a main pixel region of the pixel cell;
a second switch, disposed in a sub pixel region of the pixel cell;
a voltage-dividing switch, disposed in the sub pixel region of the pixel cell, and coupled to the second switch; and
a common electrode line, connected to the voltage-dividing switch, wherein the common electrode line comprises a first common electrode line and a second common electrode line, both the first and second common electrode lines are connected to the same voltage-dividing switch, the first common electrode line and the second common electrode line are mutually perpendicular from each other, wherein control ends of the first switch, the second switch, and the voltage-dividing switch are respectively connected to a same scan line, the voltage-dividing switches of a part of the pixel cells are connected to the first common electrode line through connecting holes, and the voltage-dividing switches of another part of the pixel cells are connected to the second common electrode line; and
wherein at least one pixel cell is connected to the second common electrode line and the pixel cell connected to the second common electrode line be selected from any one of a blue pixel cell, a red pixel cell, and a green pixel cell, when the pixel cells connected to the first common electrode have a same color, other pixel cells connected to the second common electrode have different colors, and when the pixel cells connected to the first common electrode have different colors, other pixel cells connected to the second common electrode have a same color.

2. The pixel-related circuit according to claim 1, wherein in different pixel groups, pixel cells that have different colors or the same color are connected to the second common electrode line.

3. The pixel-related circuit according to claim 1, wherein in different pixel groups, pixel cells connected to the first common electrode line have different colors or the same color.

4. The pixel-related circuit according to claim 1, wherein in each pixel group, a common voltage on the first common electrode line and a common voltage on the second common electrode line are different from each other.

5. The pixel-related circuit according to claim 1, wherein in a same pixel group, any two pixel cells are connected to different data lines.

6. The pixel-related circuit according to claim 1, wherein in the pixel group, each pixel cell uses an N-domain design, wherein N is a positive integer greater than or equal to 1.

7. The pixel-related circuit according to claim 1, wherein in each pixel cell, a first conduction terminal of the first switch is connected to the data line, a second conduction terminal of the first switch is connected to a pixel electrode of the main pixel region, a first conduction terminal of the second switch is connected to the data line, a second conduction terminal of the second switch and a first conduction terminal of the third switch are jointly connected to a pixel electrode of the sub pixel region, and a second conduction terminal of the third switch is connected to the common electrode line.

8. The pixel-related circuit according to claim 7, wherein in each pixel cell, the first conduction terminal of the first switch and the first conduction terminal of the second switch are connected to a same data line.

9. The pixel-related circuit according to claim 1, wherein in a same pixel group, all the pixel cells are connected to a same scan line.

10. The pixel-related circuit according to claim 9, wherein in any two adjacent pixel groups, pixel cells located in different pixel groups are respectively connected to different scan lines.

11. The pixel-related circuit according to claim 1, wherein each pixel group comprises three pixel cells having colors different from each other, the voltage-dividing switch of a first pixel cell and the voltage-dividing switch of a second pixel cell are connected to the first common electrode line, and the voltage-dividing switch of a third pixel cell is connected to the second common electrode line.

12. The pixel-related circuit according to claim 11, wherein the third pixel cell is a blue pixel cell, a red pixel cell or a green pixel cell.

13. The pixel-related circuit according to claim 1, wherein each pixel group comprises four pixel cells having colors different from each other, the voltage-dividing switches of a first pixel cell and a second pixel cell are connected to the first common electrode line, and the voltage-dividing switches of a third pixel cell and a fourth pixel cell are connected to the second common electrode line.

14. The pixel-related circuit according to claim 13, wherein the third pixel cell is a blue pixel cell, a red pixel cell or a green pixel cell, and the fourth pixel cell is a white pixel cell.

15. The pixel-related circuit according to claim 1, wherein each pixel group comprises four pixel cells having colors different from each other, the voltage-dividing switches of a first pixel cell, a second pixel cell, and a third pixel cell are connected to the first common electrode line, and the voltage-dividing switch of a fourth pixel cell is connected to the second common electrode line.

16. The pixel-related circuit according to claim 15, wherein the fourth pixel cell is a blue pixel cell, a red pixel cell or a green pixel cell.

17. The pixel-related circuit according to claim 1, wherein each pixel group comprises four pixel cells having colors different from each other, the voltage-dividing switch of a first pixel cell is connected to the first common electrode line, and the voltage-dividing switches of a second pixel cell, a third pixel cell, and a fourth pixel cell are connected to the second common electrode line.

18. The pixel-related circuit according to claim 17, wherein the fourth pixel cell is a white pixel cell, the second pixel cell is a blue pixel cell, a red pixel cell or a green pixel cell, and the third pixel cell is a blue pixel cell, a red pixel cell or a green pixel cell.

19. A pixel-related circuit, comprising:
a plurality of pixel groups arranged in an array, wherein each pixel group has several pixel cells, each pixel cell is coupled to a corresponding data line and a corresponding scan line, and each pixel cell comprises:
a first switch, disposed in a main pixel region of the pixel cell;
a second switch, disposed in a sub pixel region of the pixel cell;
a voltage-dividing switch, disposed in the sub pixel region of the pixel cell, and coupled to the second switch; and
a common electrode line, connected to the voltage-dividing switch, wherein the common electrode line comprises a first common electrode line and a second common electrode line, both the first and second common electrode lines are connected to the same voltage-dividing switch, the first common electrode line and the second common electrode line are mutually perpendicular from each other wherein control ends of the first switch, the second switch, and the voltage-dividing switch are respectively connected to a same scan line, the voltage-dividing switches of some pixel cells are connected to the first common electrode line through connecting holes, the voltage-dividing switches of some other pixel cells are connected to the second common electrode line, and at least one pixel cell is connected to the second common electrode line;
wherein the pixel cell connected to the second common electrode line is any one of a blue pixel cell, a red pixel cell, and a green pixel cell, and in different pixel groups, pixel cells connected to the second common electrode line have different colors or the same color;
wherein each pixel group comprises three pixel cells having colors different from each other, the voltage-dividing switch of a first pixel cell and the voltage-dividing switch of a second pixel cell are connected to the first common electrode line, and the voltage-dividing switch of a third pixel cell is connected to the second common electrode line;
the third pixel cell is a blue pixel cell, a red pixel cell or a green pixel cell; and
the first common electrode line and the second common electrode line are driven independently or simultaneously, when the pixel cells connected to the first common electrode have a same color, other pixel cells connected to the second common electrode have different colors, and when the pixel cells connected to the first common electrode have different colors, other pixel cells connected to the second common electrode have a same color.

20. A display panel, comprising:
a substrate, wherein an active switch having TFT (Thin Film Transistor) is formed on the substrate; and
a pixel-related circuit, disposed on the substrate, and coupled to the active switch, wherein the pixel-related circuit comprises:
a plurality of pixel groups arranged in an array, wherein each pixel group has several pixel cells, each pixel cell is coupled to a corresponding data line and a corresponding scan line, and each pixel cell comprises:
a first switch, disposed in a main pixel region of the pixel cell;
a second switch, disposed in a sub pixel region of the pixel cell;

a voltage-dividing switch, disposed in the sub pixel region of the pixel cell, and coupled to the second switch; and a common electrode line, connected to the voltage-dividing switch, wherein the common electrode line comprises a first common electrode line and a second common electrode line, both the first and second common electrode lines are connected to the same voltage-dividing switch, a first common electrode line and a second common electrode line are mutually perpendicular from each other, herein control ends of the first switch, the second switch, and the voltage-dividing switch are connected to a same scan line, the voltage-dividing switches of some pixel cells are connected to the first common electrode line through connecting holes, and the voltage-dividing switches of some other pixel cells are connected to the second common electrode line; and wherein at least one pixel cell is connected to the second common electrode line, and the pixel cell connected to the second common electrode line comprises any one of a blue pixel cell, a red pixel cell, and a green pixel cell, when the pixel cells connected to the first common electrode have a same color, other pixel cells connected to the second common electrode have different colors, and when the pixel cells connected to the first common electrode have different colors, other pixel cells connected to the second common electrode have a same color.

* * * * *